(12) United States Patent
Kim

(10) Patent No.: US 9,336,950 B2
(45) Date of Patent: May 10, 2016

(54) MULTILAYER CERAMIC CAPACITOR HAVING ELECTRODE LEAD OUTS THAT ARE OVERLAPPED AND HAVE CURVED SURFACES, AND METHOD OF MANUFACTURING THE SAME

(71) Applicant: SAMSUNG ELECTRO-MECHANICS CO., LTD., Suwon, Gyunggi-do (KR)

(72) Inventor: Hyung Joon Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 46 days.

(21) Appl. No.: 13/779,633

(22) Filed: Feb. 27, 2013

(65) Prior Publication Data

US 2014/0177126 A1 Jun. 26, 2014

(30) Foreign Application Priority Data

Dec. 20, 2012 (KR) ........................ 10-2012-0149345

(51) Int. Cl.
| | |
|---|---|
| *H01G 4/30* | (2006.01) |
| *H01G 4/012* | (2006.01) |
| *H01G 4/224* | (2006.01) |
| *H01G 4/232* | (2006.01) |
| *H01G 4/12* | (2006.01) |

(52) U.S. Cl.
CPC .................. *H01G 4/30* (2013.01); *H01G 4/012* (2013.01); *H01G 4/224* (2013.01); *H01G 4/232* (2013.01); *H01G 4/12* (2013.01)

(58) Field of Classification Search
CPC ........... H01G 4/005; H01G 4/30; H01G 4/12; H01G 4/232; H01G 4/012
USPC ..................................... 361/303, 321.2, 306.3
See application file for complete search history.

(56) References Cited

U.S. PATENT DOCUMENTS

| | | | |
|---|---|---|---|
| 4,771,520 A | * | 9/1988 | Tanaka et al. ................. 29/25.42 |
| 6,906,907 B2 | * | 6/2005 | Prymak et al. .............. 361/306.3 |

(Continued)

FOREIGN PATENT DOCUMENTS

| | | | |
|---|---|---|---|
| DE | 102004029411 A1 | * | 1/2006 |
| JP | 61-27327 U | | 2/1986 |

(Continued)

OTHER PUBLICATIONS

Korean Office Action issued in Korean Application No. 10-2012-0149345 dated Feb. 13, 2014, w/English translation.

(Continued)

*Primary Examiner* — David M Sinclair
(74) *Attorney, Agent, or Firm* — McDermott Will & Emery LLP

(57) ABSTRACT

There is provided a multilayer ceramic capacitor including: a ceramic body; a plurality of first and second internal electrodes including first and second body portions and first and second lead out portions, respectively; first and second external electrodes formed on one surface of the ceramic body, respectively; and an insulating layer formed on one surface of the ceramic body and covering exposed portions of the first and second lead out portions, wherein inner connection portions between the first and second body portion and the first and second lead out portions may have a concave curved surface, respectively.

18 Claims, 3 Drawing Sheets

(56) References Cited

U.S. PATENT DOCUMENTS

| | | | |
|---|---|---|---|
| 7,054,134 B2 * | 5/2006 | Togashi et al. | 361/301.4 |
| 8,593,785 B2 * | 11/2013 | Sasabayashi et al. | 361/321.2 |
| 2007/0103839 A1 * | 5/2007 | Anthony et al. | 361/118 |
| 2010/0206624 A1 * | 8/2010 | Feichtinger | 174/260 |

FOREIGN PATENT DOCUMENTS

| | | | |
|---|---|---|---|
| JP | 10-289837 A | | 10/1998 |
| JP | 11-340085 A | | 12/1999 |
| JP | 2000277382 A | * | 10/2000 |
| JP | 2004-140183 A | | 5/2004 |
| JP | 2007-503732 A | | 2/2007 |
| JP | 200954973 A | | 3/2009 |
| JP | 2013-235976 A | | 11/2013 |
| KR | 10-2005-0042919 A | | 5/2005 |
| KR | 10-2005-0089493 A | | 9/2005 |
| WO | 2004/070905 A2 | | 8/2004 |

OTHER PUBLICATIONS

Japanese Office Action issued in Japanese Application No. 2013-036879, dated Dec. 16, 2014, with English translation.
Office Action issued in related Japanese Patent Application No. 2013-036879 dated Feb. 18, 2014.

* cited by examiner

MULTILAYER CERAMIC CAPACITOR HAVING ELECTRODE LEAD OUTS THAT ARE OVERLAPPED AND HAVE CURVED SURFACES, AND METHOD OF MANUFACTURING THE SAME

CROSS-REFERENCE TO RELATED APPLICATIONS

This application claims the priority of Korean Patent Application No. 10-2012-0149345 filed on Dec. 20, 2012, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same.

2. Description of the Related Art

Electronic components using a ceramic material include capacitors, inductors, piezoelectric elements, varistors, thermistors, and the like.

Among ceramic electronic components using a ceramic material, a multilayer ceramic capacitor (MLCC) has advantages such as compactness, guaranteed high capacity, and ease of mountability.

An MLCC is a chip-type condenser commonly installed in imaging devices such as liquid crystal displays (LCDs), plasma display panels (PDPs), and the like, computers, personal digital assistants (PDAs), mobile phones, and the like, serving to charge and discharge electricity.

An MLCC may include a plurality of dielectric layers, first and second internal electrodes disposed to face each other with a dielectric layer interposed therebetween, and first and second external electrodes electrically connected to the first and second internal electrodes, respectively.

Recently, as electronic products have been reduced in size, MLCCs used in electronic products have also been required to be smaller and have a high capacity.

Thus, MLCCs including thinned dielectric layers and internal electrodes so as to contribute to reductions in product size and having an increased lamination amount of dielectric layers so as to contribute to high capacity in a product have been manufactured, but there is a limitation in increasing capacity of a product with such a configuration.

Thus, in order to increase capacity of a product, a so-called bottom mount-type MLCC having a structure in which an overlap region of inner electrodes is increased and lead out portions of the internal electrodes are formed together on any one of surfaces of a ceramic body (for example, a lower surface of the ceramic body) so as to be mounted on a board, or the like, has been proposed.

In the case of the bottom mount-type MLCC, a width-direction margin portion is provided in a corner portion of a dielectric layer such that lead out portions of different electrodes do not overlap.

However, the width-directional margin portion is positioned to be closer to a front edge of the dielectric layer, and thus, when dielectric layers are laminated, a step of the corner portion in the width direction may be increased relative to a central portion in which the internal electrodes are formed.

Also, the width-directional margin portion has a quadrangular step-like shape, and thus, when a plurality of dielectric layers are compressed, local non-uniformity occurs due to a material transfer in the corner portion of the ceramic body, causing cracks or delamination in the corner portion of the ceramic body to degrade reliability.

Patent document 1 below presented a structure in which lead out portions of internal electrodes are led out to the same surface of a board, but it does not disclose a structure in which a body part of an internal electrode and an inner connection portion of a lead out portion are curved.

RELATED ART DOCUMENT (Patent document 1) Japanese Patent Laid Open Publication No. 1998-289837

SUMMARY OF THE INVENTION

An aspect of the present invention provides a multilayer ceramic capacitor in which an overlap region of internal electrodes is increased and lead out portions are unified in one direction of a ceramic body to increase capacity and allow for bottom mounting, and a material transfer in a margin portion in a width direction is facilitated during a process of compressing a plurality of dielectric layers to restrain local non-uniformity in a corner portion of the ceramic body to reduce a likelihood of generation of cracks or delamination to thus enhance product reliability, and a method of manufacturing the same.

According to an aspect of the present invention, there is provided a multilayer ceramic capacitor including: a ceramic body in which a plurality of dielectric layers are laminated; a plurality of first and second internal electrodes including first and second body portions alternately formed on the plurality of dielectric layers and overlapped with each other and first and second lead out portions having a mutual overlap region and extending from one surfaces of the first and second body portions so as to be exposed to one surface of the ceramic body, respectively; first and second external electrodes formed on one surface of the ceramic body and electrically connected to the first and second lead out portions, respectively; and an insulating layer formed on one surface of the ceramic body and covering exposed portions of the first and second lead out portions, wherein inner connection portions between the first and second body portion and the first and second lead out portions may have a concave curved surface, respectively.

When it is defined that a point starting from the first or second lead out portion of the inner connection portion is x', a point starting from the first or second body portion is y', a point at which a line extending from x' along a front edge surface of the first or second lead out portion in a width direction and a line extending from y' along a front edge surface of the first or second body portion in a length direction meet is o, a point at which a line extending along one exposed lateral surface of the first or second lead out portion and a line extending along one end surface of the first or second body portion meet is c, a point at which a straight line extending to connect o and c and the inner connection portion meet is a, and a point at which a straight line connecting x' and y' and the straight line extending to connect o and c meet is a', it may be satisfied that a length of a segment oa≤a length of a segment oa' and the length of the segment oa≤0.5×a length of a segment oc.

The first external electrode may be connected to a region, of the first lead out portion, not overlapped with the second lead out portion, and the second external electrode may be connected to a region, of the second lead out portion, not overlapped with the first lead out portion.

The insulating layer may be formed on one surface of the ceramic body to cover the entirety of exposed portions of the first and second lead out portion.

The first and second internal electrodes may further include third and fourth lead out portions having a mutual overlap portion and extending from the other surfaces of the first and second body portions so as to be exposed to the other surface of the ceramic body opposing the one surface thereof, wherein inner connection portions of the first and second body portions and the third and fourth lead out portions may have a concave curved surface.

When it is defined that a point starting from the third or fourth lead out portion of the inner connection portion is x', a point starting from the first or second body portion is y', a point at which a line extending from x' along a front edge surface of the third or fourth lead out portion in a width direction and a line extending from y' along a front edge surface of the first or second body portion in a length direction meet is o, a point at which a line extending along one exposed lateral surface of the third or fourth lead out portion and a line extending along one end surface of the first or second body portion meet is c, a point at which a straight line extending to connect o and c and the inner connection portion meet is a, and a point at which a straight line connecting x' and y' and the straight line extending to connect o and c meet is a', it may be satisfied that a length of a segment oa≤a length of a segment oa' and the length of the segment oa≤0.5×a length of a segment oc.

The multilayer ceramic capacitor may further include third and fourth external electrodes formed on the other surface of the ceramic body and electrically connected to the third and fourth lead out portions.

The third external electrode may be connected to a region, of the third lead out portion, not overlapped with the fourth lead out portion, and the fourth external electrode may be connected to a region, of the fourth lead out portion, not overlapped with the third lead out portion.

An insulating layer may be further formed on the other surface of the ceramic body to cover the entirety of exposed portions of the third and fourth lead out portions.

According to another aspect of the present invention, there is provided a method of manufacturing a multilayer ceramic capacitor, including: forming a first internal electrode on a first ceramic sheet, the first internal electrode including a first body portion and a first lead out portion extending from one surface of the first body portion so as to be exposed to one surface of the first ceramic sheet, and an inner connection portion of the first body portion and the first lead out portion of the first internal electrode having a concave curved surface; forming a second internal electrode on a second ceramic sheet, the second internal electrode including a second body portion and a second lead out portion extending from one surface of the second body portion so as to be exposed to one surface of the second ceramic sheet, and an inner connection portion of the second body portion and the second lead out portion of the second internal electrode having a concave curved surface; alternately laminating a plurality of first and second ceramic sheets with the first and second internal electrode formed thereon, and firing the same to form a ceramic body; forming first and second external electrodes on one surface of the ceramic body such that the first and second external electrodes are electrically connected to the first and second lead out portions; and forming a first insulating layer on one surface of the ceramic body to cover exposed portions of the first and second lead out portions.

In the forming of the insulating layer, the insulating layer may be formed by applying a ceramic slurry to one surface of the ceramic body to cover the entirety of exposed portions of the first and second lead out portions.

The first and second internal electrodes may further include third and fourth lead out portions formed on the first and second ceramic sheets and extending from the other surfaces of the first and second body portions so as to be exposed to the other surfaces of the first and second ceramic sheets, wherein the third and fourth lead out portions may have a mutual overlap region and inner connection portions of the first and second body portions and the third and fourth lead out portions may have a concave curved surface.

An insulating layer may be further formed by applying a ceramic slurry on the other surface of the ceramic body to cover the entirety of exposed portions of the third and fourth lead out portions.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
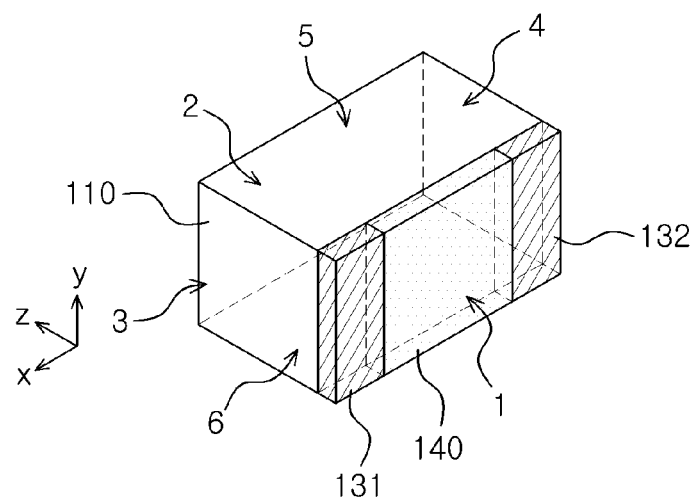
FIG. 1 is a transparent perspective view schematically showing a multilayer ceramic capacitor (MLCC) according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like components.

Figure 2:
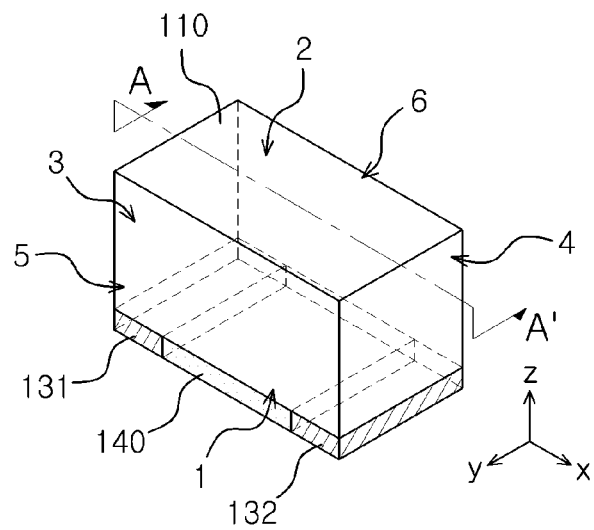
FIG. 2 is a transparent perspective view of the MLCC of FIG. 1 in a direction in which it is mounted.
Figure 3:
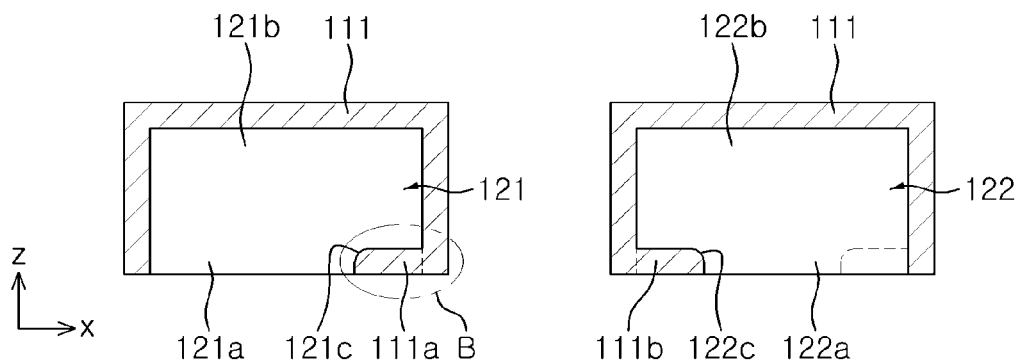
FIG. 3 is a cross-sectional view illustrating first and second internal electrodes of the MLCC of FIG. 1.
Figure 4:
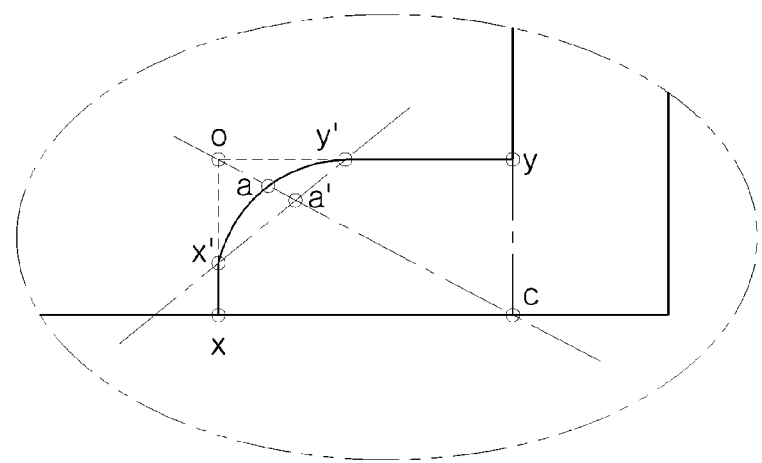
FIG. 4 is an enlarged cross-sectional view illustrating portion 'B' in FIG. 3 to explain dimensions relationship among a margin portion of a dielectric layer in a width direction, a body portion of an internal electrode, and an internal connection portion of a lead out portion.
Figure 5:
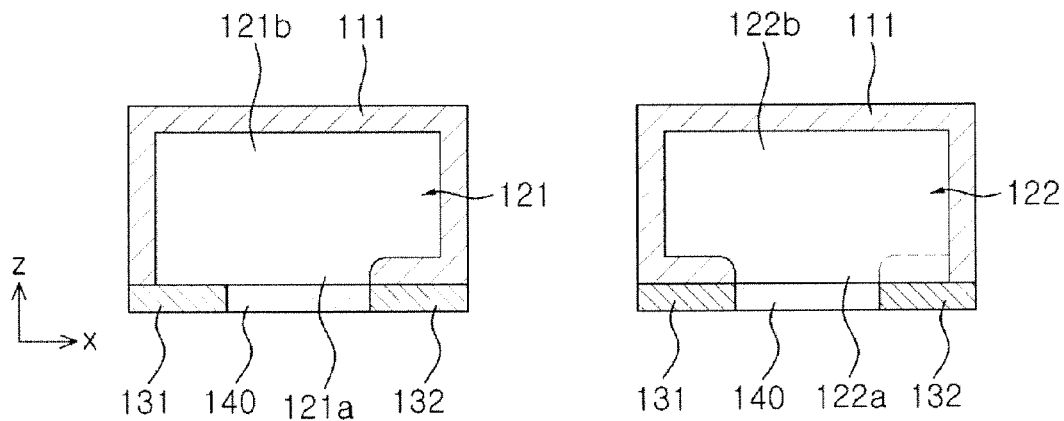
FIG. 5 is a cross-sectional view illustrating a structure in which first and second external electrodes and an insulating layer are formed in FIG. 3.

FIG. 1 is a transparent perspective view schematically showing a multilayer ceramic capacitor (MLCC) according to an embodiment of the present invention. FIG. 2 is a transparent perspective view of the MLCC of FIG. 1 in a direction in which it is mounted. FIG. 3 is a cross-sectional view illustrating first and second internal electrodes of the MLCC of FIG. 1. FIG. 4 is an enlarged cross-sectional view illustrating portion 'B' in FIG. 3 to explain dimensions relationship among a margin portion of a dielectric layer in a width direction, a body portion of an internal electrode, and an internal connection portion of a lead out portion. FIG. 5 is a cross-sectional view illustrating a structure in which first and second external electrodes and an insulating layer are formed in FIG. 3.

According to an embodiment of the present invention, an x-axis direction may be a direction in which first and second external electrodes 131 and 132 are formed with a predetermined interval therebetween, a y-axis direction may be a direction in which first and second internal electrodes 121 and 122 are laminated with a dielectric layer 111 interposed therebetween, and a z-axis direction may be a width direction of a ceramic body 110 in which first and second lead out portions 121a and 122a of the first and second internal electrodes 121 and 122 are exposed.

Referring to FIGS. 1 through 5, an MLCC according to an embodiment of the present invention may include the ceramic body 110, the first and second internal electrodes formed within the ceramic body 110, the first and second external electrodes 131 and 132 formed on one surface of the ceramic body 110, and an insulating layer 140.

In the present embodiment, as illustrated, the ceramic body 110 may have a hexahedral shape having a first surface 1 and a second surface 2 opposing one another, and a third surface 3, a fourth surface 4, a fifth surface 5, and a sixth surface 6 connecting the first surface 1 and the second surface 2, but the present invention is not limited thereto. According to the present embodiment, the first surface 1 of the ceramic body 110 may be a mount surface disposed in a mounting region of a circuit board. Also, dimensions of the ceramic body 110 are not particularly limited. For example, the ceramic body 110 may be configured to have a size of 1.0 mm×0.5 mm to form an MLCC having high capacitance.

The ceramic body 110 may be formed by laminating a plurality of dielectric layers 111 and firing the same. Here, the plurality of dielectric layers 111 constituting the ceramic body 110 are in a sintered state in which adjacent dielectric layers are integrated such that boundaries therebetween may not be readily apparent.

The dielectric layers 111 may be formed by firing ceramic green sheets including ceramic powder, an organic solvent, and an organic binder. The ceramic powder is a material having a high K-dielectric constant (or high permittivity), and as the ceramic powder, for example, a barium titanate (BaTiO$_3$)-based material, a strontium titanate (SrTiO$_3$)-based material, or the like, may be used, but the present invention is not limited thereto.

The first and second internal electrodes 121 and 122 may be formed on a plurality of ceramic sheets forming the dielectric layer 111, alternately laminated, and disposed in the y-axis direction such that they face one another with one dielectric layer 111 interposed therebetween within the ceramic body 110.

The first and second internal electrodes 121 and 122 may be electrically insulated by the dielectric layer 111 interposed therebetween. In the present embodiment, the first and second internal electrodes 121 and 122 may be disposed to be perpendicular to the mounting surface, i.e., the first surface 1, of the MLCC.

Also, the first and second internal electrodes 121 and 122 may be formed by printing a conductive paste including a conductive metal on at least one surface of the dielectric layer 111. The conductive metal may be nickel (Ni), copper (Cu), palladium (Pd), or an alloy thereof, but the present invention is not limited thereto. Also, as the method of printing the conductive paste, a screen printing method, a gravure printing method, or the like, may be used, but the present invention is not limited thereto.

The first and second internal electrodes 121 and 122 may include first and second body portions 121b and 122b disposed within the dielectric layer 111 and overlapped to form capacitance and first and second lead out portions 121a and 122a extending from one surfaces of the first and second body portions 121b and 122b to one surface of the dielectric layer 111, namely, extending to be exposed to one surface of the ceramic body 110, and electrically connected to the first and second external electrodes 131 and 132 having different polarities, respectively.

In the present embodiment, the first and second lead out portions 121a and 122a are regions extending from conductive patterns forming the first and second internal electrodes 121 and 122 so as to be exposed to the first surface 1 of the ceramic body 110 and having an increased width.

In a general MLCC, capacitance is formed by the mutual overlap region of the first and second internal electrodes 121 and 122, and the first and second lead out portions 121a and 122a connected to the first and second external electrodes 131 and 132 do not have an overlap region.

However, according to the present embodiment, the first and second lead out portions 121a and 122a may have a mutual overlap region. Namely, in the first and second lead out portions 121a and 122a, portions of the regions exposed to the first surface 1 may overlap to further increase capacitance of the capacitor.

In the right drawing of FIG. 3, a region of the first internal electrode 121 overlapped with the second internal electrode 122 is indicated by the dotted line.

Also, the inner connection portions 121c and 122c of the first and second body portions 121b and 122b and the first and second lead out portions 121a and 122a may have curved surfaces convex toward the interior of the dielectric layer 111 (or convex inwardly from the dielectric layer 111).

Here, in order to prevent an occurrence of cracks or delamination in the corner portion of the ceramic body 110, the inner connection portions between the first and second body portions and the first and second lead out portions may have curved surfaces.

When it is defined that a point starting from the first or second lead out portion of the inner connection portions 121c and 122c is x', a point starting from the first or second body portion 121b or 122b is y', a point at which a line extending from x' along a front edge surface of the first or second lead out portion 121a or 122a in a width direction and a line extending from y' along a front edge surface of the first or second body portion 121b or 122b in a length direction meet is o, a point at which a line extending along one exposed lateral surface of the first or second lead out portion 121a or 122a and a line extending along one end surface of the first or second body portion 121b or 122b meet is c, a point at which a straight line extending to connect o and c and the inner connection portions 121c and 122c meet is a, and a point at which a straight line connecting x' and y' and the straight line extending to connect o and c meet is a', it may be satisfied that a length of a segment oa is equal to or smaller than a length of a segment oa' and the length of the segment oa may be equal to or smaller than (0.5×a length of a segment oc).

If the length of the segment oa exceeds the length of the segment oa' or exceeds (0.5× the length of the segment oc), a material transfer in the margin portions 111a and 111b of the dielectric layer 111 in the width direction becomes difficult when the plurality of dielectric layers 111 are compressed, generating local non-uniformity to cause cracks or delamination in the corner portion of the ceramic body 110.

The first and second external electrodes 131 and 132 are formed on the first surface 1 of the ceramic body 110 and come into contact with the first and second lead out portions 121a and 122a so as to be electrically connected.

Here, the first external electrode 131 may be connected to a region, of the first lead out portion 121a, not overlapped with the second lead out portion 122a, and the second external electrode 132 may be connected to a region, of the second lead out portion 122a, not overlapped with the first lead out portion 121a.

The insulating layer 140 may be formed on the first surface 1 of the ceramic body 110. The insulating layer 140 may cover exposed portions of the first and second lead out portions 121a and 122a exposed to the first surface 1 of the ceramic body 110, and if necessary, the insulating layer 140 may be formed to cover the entire overlap regions of the first and second lead out portions 121a and 122a which are exposed.

Also, the insulating layer 140 may be formed to completely fill the first surface 1 of the ceramic body 110 between the first and second external electrodes 131 and 132. However, the present invention is not limited thereto and, if necessary, the insulating layer 140 may be formed to cover only an overlap region of the first and second lead out portions 121a and 122a and formed to be spaced apart from the first and second external electrodes 131 and 132.

The insulating layer 140 configured thusly may serve to prevent a short-circuit between the first and second internal electrodes 121 and 122 and the first and second external electrodes 131 and 132, an internal defect such as degraded moisture resistance characteristics, and the like.

Figure 6:
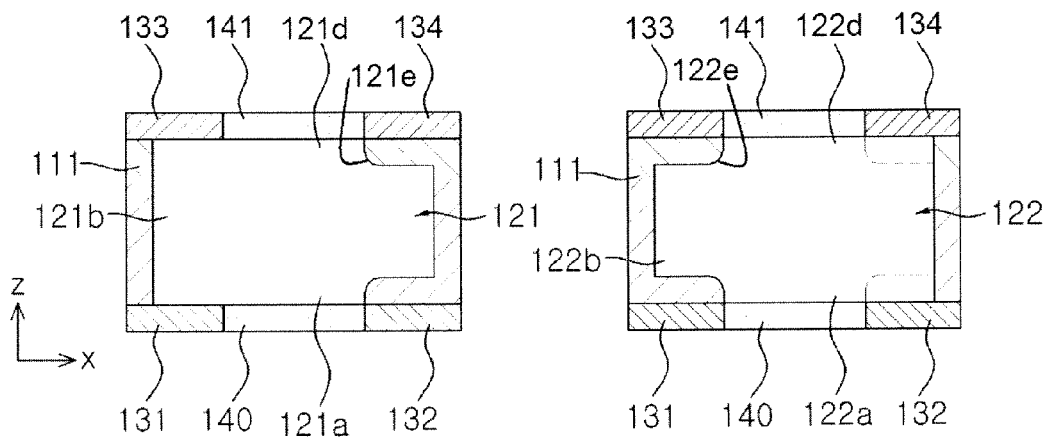
FIG. 6 is a cross-sectional view illustrating another MLCC according to an embodiment of the present invention.

Meanwhile, in the MLCC according to the present embodiment, the first and second internal electrodes 121 and 122 may have a mutual overlap region and may further include third and fourth lead out portions 121d and 122d exposed to the other surface of the dielectric layer 111, i.e., to the second surface 2 of the ceramic body 110, as shown in FIG. 6.

The third and fourth lead out portions 121d and 122d may extend from the other surface of the first and second body portions 121b and 122b to the second surface 2 of the ceramic body 110 and oppose the first and second lead out portions 121a and 122a, respectively.

Here, the inner connection portions 121c, 122c, 121e, and 122e respectively of the first and second body portions 121b and 122b and the third and fourth lead out portions 121d and 122d may have curved surfaces. Also, the inner connection portions 121c, 122c, 121e, and 122e of the first and second body portions 121b and 122b and the third and fourth lead out portions 121d and 121d of the embodiment of FIG. 6 may have a similar structure as that of the inner connection portions 121c and 122c of the first and second body portions 121b and 122b and the first and second lead out portions 121a and 122a of the embodiment of FIG. 3. Thus, in order to avoid redundancy, a detailed description of the inner connection portions 121c, 122c, 121e, and 122e of the first and second body portions 121b and 122b and the third and fourth lead out portions 121d and 122d of FIG. 6 will be omitted.

Third and fourth external electrodes 133 and 134 may be formed on the second surface 2 of the ceramic body 110 and electrically connected to the third and fourth lead out portions 121d and 122d.

The third external electrode 133 may be connected to a region, of the third lead out portion 121d, not overlapped with the fourth lead out portion 122d, and the fourth external electrode 134 may be connected to a region, of the fourth lead out portion 122d, not overlapped with the third lead out portion 121d.

Also, an insulating layer 141 may be further formed on the second surface 2 of the ceramic body 110 to cover exposed portions of the third and fourth lead out portions 121d and 122d. Here, the insulating layer 141 may cover the entire overlap portions of the third and fourth lead out portions 121d and 122d which are exposed.

In the present embodiment, 'first' and 'second' may refer to mutually different polarities, and 'first' and 'third' and 'second' and 'fourth' may refer to the same polarity, respectively.

Hereinafter, a method of manufacturing an MLCC according to an embodiment of the present invention will be described.

First, a plurality of first and second ceramic sheets are prepared.

The first and second ceramic sheets, serving to form the dielectric layers 111 of the ceramic body 110, may be fabricated by preparing slurry by mixing ceramic powder, polymer, a solvent, and the like, and processing the slurry into sheets having a thickness of a few μm through a method such as a doctor blade process, or the like.

The ceramic powder may include barium titanate (BaTiO$_3$). However, the present invention is not limited thereto and the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, obtained by adding calcium (Ca), zirconium (Zr), or the like, to barium titanate (BaTiO$_3$).

The slurry may be prepared by mixing a ceramic additive, an organic solvent, a plasticizer, a binder, and a dispersing agent and by using a basket mill.

Thereafter, a conductive paste is printed to have a predetermined thickness on at least one surfaces of the first and second ceramic sheets to form the first and second internal electrodes 121 and 122.

Here, the first internal electrodes 121 may include two or more first lead out portions exposed to one surface of the first ceramic sheet, and in this case, two or more external electrodes corresponding thereto may be formed.

The first and second internal electrodes 121 and 122 may include the first and second body portions 121b and 122b positioned to overlap within the first and second ceramic sheets and the first and second lead out portions 121a and 122a extending from one surfaces of the first and second body portions 121b and 122b so as to be exposed to one surfaces of the first and second ceramic sheets. Here, the first and second lead out portions 121a and 122a may have a mutual overlap region, and the inner connection portions of the first and second body portions 121b and 122b and the first and second lead out portions 121a and 122a may be formed to have an inwardly convex curved surface.

The conductive paste may be printed by using a screen printing method, a gravure printing method, or the like. The conductive paste may include metal powder, ceramic powder, silica (SiO$_2$) powder, and the like.

Meanwhile, the first and second internal electrodes may further include third and fourth lead out portions formed on the first and second ceramic sheets such that the third and fourth lead out portions extend from the other surfaces of the first and second body portions so as to be exposed to the other surfaces of the first and second ceramic sheets. Here, the third and fourth lead out portions may have a mutual overlap region, and inner connection portions of the first and second body portions 121b and 122b and the third and fourth lead out portions may be formed to have an inwardly convex curved surface.

Thereafter, the plurality of first and second ceramic sheets with the first and second internal electrodes 121 and 122 formed thereon are alternately laminated, and the laminated first and second ceramic sheets and the first and second internal electrodes 121 and 122 are pressed in the lamination direction so as to be compressed. Accordingly, a laminate in which the plurality of dielectric layers 111 and the plurality of first and second internal electrodes 121 and 122 are alternately laminated is configured.

Thereafter, regions corresponding to respective MLCCs of the laminate are cut to form chips, and the severed chip is calcined and fired at a high temperature and subsequently grinded to complete the ceramic body 110 having the first and second internal electrodes 121 and 122.

Thereafter, the first and second external electrodes 131 and 132 are formed on the first surface 1 of the ceramic body 110 such that they are in contact with portions of the first and second lead out portions 121a and 122a so as to be electrically connected thereto.

The first external electrode 131 may be formed to be vertically elongated in a region of the first lead out portion 121a, not overlapped with the second lead out portion 122a, in the thickness direction of the ceramic body 110 on the first surface 1 of the ceramic body 110. Also, the second external electrode 132 may be formed to be vertically elongated in a region of the second lead out portion 122a, not overlapped with the first lead out portion 121a, in the thickness direction of the ceramic body 110 on the first surface 1 of the ceramic body 110.

Through such a configuration, the first surface 1 of the ceramic body 110 may be a mounting surface to be mounted on a board, or the like.

Meanwhile, in case that the third and fourth lead out portions are formed, third and fourth external electrodes may be further formed to be in contact with exposed portions of the third and fourth lead out portions on the second surface 2 of the ceramic body 110 so as to be electrically connected thereto.

The third external electrode 131 may be formed to be vertically elongated in a region of the third lead out portion, not overlapped with the fourth lead out portion, in the thickness direction of the ceramic body 110 on the second surface 2 of the ceramic body 110. Also, the fourth external electrode may be formed to be vertically elongated in a region of the fourth lead out portion, not overlapped with the third lead out portion, in the thickness direction of the ceramic body 110 on the first surface 2 of the ceramic body 110.

Thereafter, a ceramic slurry is applied to the first surface 1 of the ceramic body 110 such that it covers the entirety of the exposed portions of the first and second lead out portions 121a and 122a, to form the insulating layer 140.

Here, in the case of forming the third and fourth lead out portions, a ceramic slurry is also applied to the second surface 2 of the ceramic body 110 such that it covers the entirety of the exposed portions of the third and fourth lead out portions, to form an insulating layer.

A method of applying the slurry may include, for example, a spraying method, a method using a roller, or the like, and the present invention is not limited thereto.

As set forth above, according to embodiments of the invention, an overlap region of internal electrodes is increased and lead out portions thereof are unified in one direction of a ceramic body to increase capacity of the MLCC and bottom mounting is available.

In addition, since the inner connection portion of the body portion and the lead out portion of the internal electrode is formed to have an inwardly convex curved surface, a material transfer in the margin portion in a width direction is facilitated during a process of compressing a plurality of dielectric layers to restrain local non-uniformity in the corner portion of the ceramic body to thereby minimize a generation of cracks or delamination in the corner portion of the ceramic body after a firing operation, thus enhancing product reliability of the MLCC.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body in which a plurality of dielectric layers are laminated;
   a plurality of first and second internal electrodes including first and second body portions alternately formed on the plurality of dielectric layers, overlapped with each other, and spaced away from edges of the dielectric layers, and first and second lead out portions having a mutual overlap region and extending from one surface of the first and second body portions so as to be exposed to one surface of the ceramic body, respectively;
   first and second external electrodes formed on the one surface of the ceramic body and electrically connected to the first and second lead out portions, respectively; and
   an insulating layer formed on the one surface of the ceramic body and covering exposed portions of the first and second lead out portions,
   wherein inner connection portions, formed between the first body portion and the first lead out portion and between the second body portion and the second lead out portion, have a concave curved surface formed in a region overlapping the second lead out portion and the first lead out portion, respectively,
   wherein when it is defined that a point starting from the first or second lead out portion of the inner connection portion is x', a point starting from the first or second body portion is y', a point at which a line extending from x' along a front edge surface of the first or second lead out portion in a width direction and a line extending from y' along a front edge surface of the first or second body portion in a length direction meet is o, a point at which a line extending along one exposed lateral surface of the first or second lead out portion and a line extending along one end surface of the first or second body portion meet is c, a point at which a straight line extending to connect o and c and the inner connection portion meet is a, and a point at which a straight line connecting x' and y' and the straight line extending to connect o and c meet is a',
   a length of a segment oa is less than or equal to a length of a segment oa' and the length of the segment oa is less than or equal to 0.5×a length of a segment oc, and
   wherein the first and second internal electrodes further respectively include third and fourth lead out portions that are partially overlapped with each other and respectively extend from another surface of a respective one of the first and second body portions so as to be exposed to another surface of the ceramic body opposing the one surface thereof, wherein each of inner connection portions formed between the first and second body portions and the third and fourth lead out portions has a concave curved surface,
   wherein corners of the first and second body portions of the first and second internal electrodes are of a different type than corners between the first and second lead out portions and the first and second body portions, such that corners of the first and second body portions of the first and second internal electrodes are substantially right-angled corners and corners between the first and second lead out portions and the first and second body portions are curved, and wherein the inner connection portions between the first and second body portions and the first and second lead out portions are of different shapes on different sides of the first and second lead out portions, such that one side of the first lead out portion is aligned with one side of the first body portion and is connected thereto by a straight surface while another side of the first lead out portion is connected to the first body portion by the concave curved surface, and one side of the second lead out portion is aligned with one side of the second body portion and is connected thereto by a straight surface while another side of the second lead out portion is connected to the second body portion by the concave curved surface.

2. The multilayer ceramic capacitor of claim 1, wherein the first external electrode is connected to a region, of the first lead out portion, not overlapped with the second lead out portion, and the second external electrode is connected to a region, of the second lead out portion, not overlapped with the first lead out portion.

3. The multilayer ceramic capacitor of claim 1, wherein the insulating layer is formed on one surface of the ceramic body to cover the entirety of exposed portions of the first and second lead out portion.

4. The multilayer ceramic capacitor of claim 1, wherein when it is defined that a point starting from the third or fourth lead out portion of the inner connection portion is x", another point starting from the first or second body portion is y", a point at which a line extending from x" along a front edge surface of the third or fourth lead out portion in a width direction and a line extending from y" along a front edge surface of the first or second body portion in a length direction meet is o', a point at which a line extending along one exposed lateral surface of the third or fourth lead out portion and a line extending along one end surface of the first or second body portion meet is c', a point at which a straight line extending to connect o' and c' and the inner connection portion meet is a", and a point at which a straight line connecting x" and y" and the straight line extending to connect o' and c' meet is a', it is satisfied that a length of a segment o' a"≤a length of a segment o' a'" and the length of the segment o' a"≤0.5×a length of a segment o'c'.

5. The multilayer ceramic capacitor of claim 1, further comprising third and fourth external electrodes formed on the other surface of the ceramic body and electrically connected to the third and fourth lead out portions.

6. The multilayer ceramic capacitor of claim 5, wherein the third external electrode is connected to a region, of the third lead out portion, not overlapped with the fourth lead out portion, and the fourth external electrode is connected to a region, of the fourth lead out portion, not overlapped with the third lead out portion.

7. The multilayer ceramic capacitor of claim 1, wherein an insulating layer is further formed on the other surface of the ceramic body to cover the entirety of exposed portions of the third and fourth lead out portions.

8. The multilayer ceramic capacitor of claim 1, wherein the first and second body portions of the first and second internal electrodes are rectangular and have right-angled corners that are spaced away from edges of the dielectric layers, and the inner connection portions are each spaced away from edges of the dielectric layers and have the concave curved surface connecting one of the first and second lead out portions with one of the first and second rectangular body portions.

9. The multilayer ceramic capacitor of claim 1, wherein the first internal electrode includes no more than two lead out portions including the first and third lead out portions, and the second internal electrode includes no more than two lead out portions including the second and fourth lead out portions.

10. A method of manufacturing a multilayer ceramic capacitor, the method comprising:

forming a first internal electrode on a first ceramic sheet, the first internal electrode including a first body portion and a first lead out portion extending from one surface of the first body portion so as to be exposed to one surface of the first ceramic sheet, and an inner connection portion of the first body portion and the first lead out portion of the first internal electrode having a concave curved surface;

forming a second internal electrode on a second ceramic sheet, the second internal electrode including a second body portion and a second lead out portion extending from one surface of the second body portion so as to be exposed to the one surface of the second ceramic sheet, and an inner connection portion of the second body portion and the second lead out portion of the second internal electrode having a concave curved surface;

alternately laminating a plurality of first and second ceramic sheets with the first and second internal electrode formed thereon, and firing the same to form a ceramic body;

forming first and second external electrodes on the one surface of the ceramic body such that the first and second external electrodes are electrically connected to the first and second lead out portions; and forming a first insulating layer on the one surface of the ceramic body to cover exposed portions of the first and second lead out portions, wherein the inner connection portions between the first body portion and the first lead out portion and between the second body portion and the second lead out portion each having the concave curved surface are formed in a region overlapping the second lead out portion and the first lead out portion, respectively, when it is defined that a point starting from the first or second lead out portion of the inner connection portion is x', a point starting from the first or second body portion is y', a point at which a line extending from x' along a front edge surface of the first or second lead out portion in a width direction and a line extending from y' along a front edge surface of the first or second body portion in a length direction meet is o, a point at which a line extending along one exposed lateral surface of the first or second lead out portion and a line extending along one end surface of the first or second body portion meet is c, a point at which a straight line extending to connect o and c and the inner connection portion meet is a, and a point at which a straight line connecting x' and y' and the straight line extending to connect o and c meet is a', a length of a segment oa is less than or equal to a length of a segment oa' and the length of the segment oa is less than or equal to 0.5×a length of a segment oc, wherein in the forming of the first and second internal electrodes, the first and second internal electrodes further respectively include third and fourth lead out portions respectively extending from the other surfaces of a respective one of the first and second body portions so as to be exposed to the other surfaces of the first and second ceramic sheets on the first and second ceramic sheets, wherein the third and fourth lead out portions are partially overlapped with each other and each of inner connection portions of the first and second body portions and the third and fourth lead out portions has a concave curved surface, wherein corners of the first and second body portions of the first and second internal electrodes are formed to be of a different type than corners between the first and second lead out portions and the first and second body portions, such that corners of the first and second body portions of the first and second internal electrodes are substantially right-angled corners and corners between the first and second lead out portions and the first and second body portions are curved, and wherein the inner connection portions between the first and second body portions and the first and second lead out portions are formed to be of different shapes on different sides of the first and second lead out portions, such that one side of the first lead out portion is aligned with one side of the first body portion and is connected thereto by a straight surface while another side of the first lead out portion is connected to the first body portion by the concave curved surface, and one side of the second lead out portion is aligned with one side of the second body portion and is connected thereto by a straight surface while another side of the second lead out portion is connected to the second body portion by the concave curved surface.

11. The method of claim 10, wherein in the forming of the first and second external electrodes, the first external electrode is formed to be connected to a region, of the first lead out portion, not overlapped with the second lead out portion, on one surface of the ceramic body, and the second external electrode is formed to be connected to a region, of the second lead out portion, not overlapped with the first lead out portion, on one surface of the ceramic body.

12. The method of claim 10, wherein in the forming of the insulating layer, the insulating layer is formed on one surface of the ceramic body by applying a ceramic slurry to cover the entirety of exposed portions of the first and second lead out portion.

13. The method of claim 10, wherein when it is defined that a point starting from the third or fourth lead out portion of the inner connection portion is x", another point starting from the first or second body portion is y", a point at which a line extending from x" along a front edge surface of the third or fourth lead out portion in a width direction and a line extending from y" along a front edge surface of the first or second body portion in a length direction meet is o', a point at which a line extending along one exposed lateral surface of the third or fourth lead out portion and a line extending along one end surface of the first or second body portion meet is c', a point at which a straight line extending to connect o' and c' and the inner connection portion meet is and a point at which a straight line connecting x" and y" and the straight line extending to connect o' and c' meet is a''', it is satisfied that a length of a segment o' a"≤a length of a segment o' a''' and the length of the segment o' a">0.5×a length of a segment o'c'.

14. The method of claim 10, further comprising forming third and fourth external electrodes on the other surface of the ceramic body such that the third and fourth external electrodes are electrically connected to the third and fourth lead out portions.

15. The method of claim 14, wherein in the forming of the third and fourth external electrodes, the third external electrode is formed to be connected to a region, of the third lead out portion, not overlapped with the fourth lead out portion on the outer surface of the ceramic body, and the fourth external electrode is formed to be connected to a region, of the fourth lead out portion, not overlapped with the third lead out portion on the other surface of the ceramic body.

16. The method of claim 10, further comprising applying a ceramic slurry to the other surface of the ceramic body to form an insulating layer covering the entirety of exposed portions of the third and fourth lead out portions.

17. The method of claim 10, wherein the first and second body portions of the first and second internal electrodes are formed to be rectangular and to have right-angled corner that are spaced away from edges of the ceramic sheets, and the inner connection portions are each formed to be spaced away from edges of the ceramic sheets and to have the concave curved surface connecting one of the first and second lead out portions with one of the first and second rectangular body portions.

18. The method of claim 10, wherein the first internal electrode includes no more than two lead out portions including the first and third lead out portions, and the second internal electrode includes no more than two lead out portions including the second and fourth lead out portions.

* * * * *